United States Patent
Yamaguchi (10) Patent No.: US 11,688,852 B2
(45) Date of Patent: Jun. 27, 2023

(54) NEGATIVE ELECTRODE ACTIVE MATERIAL INCLUDING AL- AND O-CONTAINING SILICON MATERIAL

(71) Applicant: KABUSHIKI KAISHA TOYOTA JIDOSHOKKI, Kariya (JP)

(72) Inventor: Yasuhiro Yamaguchi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 350 days.

(21) Appl. No.: 16/645,657

(22) PCT Filed: Jun. 18, 2018

(86) PCT No.: PCT/JP2018/023075
§ 371 (c)(1),
(2) Date: Mar. 9, 2020

(87) PCT Pub. No.: WO2019/053982
PCT Pub. Date: Mar. 21, 2019

(65) Prior Publication Data
US 2020/0266432 A1    Aug. 20, 2020

(30) Foreign Application Priority Data
Sep. 14, 2017 (JP) ................. 2017-177198

(51) Int. Cl.
*H01M 4/485* (2010.01)
*H01M 4/587* (2010.01)
(Continued)

(52) U.S. Cl.
CPC ............. *H01M 4/485* (2013.01); *C01B 33/26* (2013.01); *H01M 4/366* (2013.01); *H01M 4/587* (2013.01);
(Continued)

(58) Field of Classification Search
None
See application file for complete search history.

(56) References Cited

U.S. PATENT DOCUMENTS 9,527,748 B2    12/2016    Sugiyama et al.
9,865,871 B2    1/2018    Miyake et al.
(Continued)

FOREIGN PATENT DOCUMENTS

CN    104798229 A    7/2015
CN    106458610 A    2/2017
(Continued)

OTHER PUBLICATIONS

International Search Report for PCT/JP2018/023075 dated Aug. 7, 2018 [PCT/ISA/210].
(Continued)

*Primary Examiner* — Zhongqing Wei
(74) *Attorney, Agent, or Firm* — Sughrue Mion, PLLC (57) ABSTRACT

A new silicon material is provided.
A negative electrode active material including an Al- and O-containing silicon material, the Al- and O-containing silicon material being configured such that a mass % of Al ($W_{Al}$ %) satisfies $0<W_{Al}<1$, and a peak indicating Al—O bond is observed in a range of 1565 to 1570 eV in an X-ray absorption fine structure measurement for a K shell of Al.

10 Claims, 2 Drawing Sheets

(51) Int. Cl.
  *H01M 10/0525* (2010.01)
  *C01B 33/26* (2006.01)
  *H01M 4/36* (2006.01)
  *H01M 4/02* (2006.01)

(52) U.S. Cl.
  CPC ..... *H01M 10/0525* (2013.01); *C01P 2002/52* (2013.01); *C01P 2002/74* (2013.01); *C01P 2002/85* (2013.01); *C01P 2002/88* (2013.01); *C01P 2006/40* (2013.01); *H01M 2004/027* (2013.01)

(56) References Cited

U.S. PATENT DOCUMENTS

| | | |
|---|---|---|
| 10,476,073 B2 | 11/2019 | Oshima et al. |
| 2015/0044560 A1 | 2/2015 | Ogino |
| 2015/0251915 A1 | 9/2015 | Nakanishi et al. |
| 2015/0280208 A1 | 10/2015 | Kimura et al. |
| 2015/0307362 A1 | 10/2015 | Sugiyama et al. |
| 2016/0190576 A1* | 6/2016 | Miyake ........... C01B 33/113 252/182.1 |
| 2017/0200949 A1 | 7/2017 | Harata et al. |
| 2017/0256793 A1* | 9/2017 | Oshima ........... H01M 4/587 |
| 2018/0151873 A1 | 5/2018 | Matsuno et al. |
| 2018/0248169 A1 | 8/2018 | Ogino |
| 2018/0287193 A1 | 10/2018 | Matsuno et al. |

FOREIGN PATENT DOCUMENTS

| | | |
|---|---|---|
| JP | 2006-100255 A | 4/2006 |
| JP | 2011-090806 A | 5/2011 |
| JP | 2014-203595 A | 10/2014 |
| JP | 2015-057767 A | 3/2015 |
| JP | 2015-179625 A | 10/2015 |
| JP | 2015-185509 A | 10/2015 |
| JP | 2016-124783 A | 7/2016 |
| JP | 2017-027959 A | 2/2017 |
| JP | 2017-091978 A | 5/2017 |
| WO | 2014/080608 A1 | 5/2014 |
| WO | 2016/031146 A1 | 3/2016 |
| WO | 2016/194288 A1 | 12/2016 |

OTHER PUBLICATIONS

Written Opinion for PCT/JP2018/023075 dated Aug. 7, 2018 [PCT/ISA/237].
Communication dated Feb. 3, 2021, from the Japanese Patent Office in JP Application No. 2017-177198.
Communication dated Aug. 5, 2022 from the Chinese Patent Office in Chinese Application No. 201880059429.4.

* cited by examiner

NEGATIVE ELECTRODE ACTIVE MATERIAL INCLUDING AL- AND O-CONTAINING SILICON MATERIAL

CROSS REFERENCE TO RELATED APPLICATIONS

This application is a National Stage of International Application No. PCT/JP2018/023075 filed Jun. 18, 2018, claiming priority based on Japanese Patent Application No. 2017-177198 filed Sep. 14, 2017.

TECHNICAL FIELD

The present invention relates to a negative electrode active material including an Al- and O-containing silicon material.

BACKGROUND ART

Silicon materials that contain silicon as a main component are known to be used as constituents of semiconductors, solar batteries, secondary batteries, and the like, and studies on silicon materials are actively being conducted in recent years.

For example, Patent Literature 1 and Patent Literature 2 each describe a lithium ion secondary battery of which a negative electrode active material is silicon.

Patent Literature 3 and Patent Literature 4 each describe a lithium ion secondary battery of which a negative electrode active material is SiO.

Patent Literature 5 describes synthesizing a layered polysilane by reacting $CaSi_2$ with acid, and indicates that a lithium ion secondary battery including the layered polysilane as a negative electrode active material exhibits a suitable capacity.

Patent Literature 6 describes: synthesizing a layered polysilane by reacting $CaSi_2$ with acid; and heating the layered polysilane at not less than 300° C. to produce a nano silicon material from which hydrogen is removed. Patent Literature 6 also indicates that a lithium ion secondary battery including the nano silicon material as a negative electrode active material exhibits a suitable capacity retention rate.

CITATION LIST

Patent Literature

Patent Literature 1: JP 2014-203595(A)
Patent Literature 2: JP 2015-57767(A)
Patent Literature 3: JP 2015-185509(A)
Patent Literature 4: JP 2015-179625(A)
Patent Literature 5: JP 2011-090806(A)
Patent Literature 6: WO2014/080608

SUMMARY OF INVENTION

Technical Problem

As mentioned above, studies on silicon materials are actively being conducted, and provision of a new silicon material is desired in the technological fields of semiconductors, solar batteries, secondary batteries, and the like. The present invention has been made in consideration of such circumstances. An object of the present invention is to provide a new silicon material.

Solution to Problem

In order to provide a new silicon material, the present inventor conducted thorough investigation with many trials and errors. The present inventor considered that, since silicon itself is a semiconductor, when a silicon material is to be utilized as a negative electrode active material of a secondary battery, increasing the conductivity of the silicon material by some method is preferable. Thus, a silicon material having a small amount of Al added thereto was produced, and the resistance of a secondary battery including the silicon material was measured. As a result, the secondary battery including the silicon material having Al added thereto was found to have a low resistance when compared with a secondary battery including a silicon material not having Al added thereto. In addition, when the silicon material having Al added thereto was analyzed in detail, the silicon material was found to have Al—O bonds. The present inventor completed the present invention on the basis of said finding.

A negative electrode active material of the present invention includes an Al- and O-containing silicon material, the Al- and O-containing silicon material being configured such that a mass % of Al ($W_{Al}$ %) satisfies $0<W_{Al}<1$, and a peak indicating Al—O bond is observed in a range of 1565 to 1570 eV in an X-ray absorption fine structure measurement for a K shell of Al.

Advantageous Effects of Invention

When the negative electrode active material of the present invention is employed, a suitable secondary battery is provided.

DESCRIPTION OF EMBODIMENTS

The following describes embodiments of the present invention. Unless mentioned otherwise in particular, a numerical value range "x to y" described herein includes, in the range thereof, a lower limit x and an upper limit y. A numerical value range is formed by arbitrarily combining such upper limit values and lower limit values, and numerical values described in Examples. In addition, numerical values arbitrarily selected within a numerical value range may be used as upper limit and lower limit numerical values.

A negative electrode active material of the present invention includes an Al- and O-containing silicon material (hereinafter, sometimes referred to as "Al- and O-containing silicon material of the present invention"), the Al- and O-containing silicon material being configured such that a mass % of Al ($W_{Al}$ %) satisfies $0<W_{Al}<1$, and a peak indicating Al—O bond is observed in a range of 1565 to 1570 eV in an X-ray absorption fine structure measurement for a K shell of Al.

The Al- and O-containing silicon material of the present invention has improved conductivity due to the presence of Al, and thus, is considered to be useful as a negative electrode active material for secondary batteries having a low resistance. However, since silicon receives and releases a charge carrier at a negative electrode including a silicon material, a silicon material having too high a mass % of Al is not considered to be preferable as a negative electrode active material.

In the Al- and O-containing silicon material of the present invention, $W_{Al}$ % preferably satisfies $0<W_{Al}\leq 0.8$, preferably satisfies $0.01\leq W_{Al}\leq 0.8$, more preferably satisfies $0.05\leq W_{Al}\leq 0.6$, further preferably satisfies $0.1\leq W_{Al}\leq 0.5$, and particularly preferably satisfies $0.15\leq W_{Al}\leq 0.5$.

Herein, a silicon material means a material that contains silicon as a main component. The mass % of Si ($W_{Si}$ %) in the Al- and O-containing silicon material of the present invention preferably satisfies $60\leq W_{Si}\leq 90$, more preferably satisfies $70\leq W_{Si}\leq 85$, and further preferably satisfies $80\leq W_{Si}\leq 85$.

When the mass % of Si is too low, the capacity per unit mass of the Al- and O-containing silicon material of the present invention is reduced, and thus, the performance as the negative electrode active material becomes insufficient in some cases. When the mass % of Si is too high, the degree of expansion and contraction of the Al- and O-containing silicon material of the present invention during charging and discharging is increased too much, and damage of the Al- and O-containing silicon material of the present invention becomes a concern.

In the Al- and O-containing silicon material of the present invention, a peak indicating Al—O bond is observed in a range of 1565 to 1570 eV in an X-ray absorption fine structure measurement for the K shell of Al. The Al—O bond mentioned above is considered to have been formed because water was used during production of a precursor of the Al- and O-containing silicon material of the present invention, and thus Al present on the surface of the precursor reacted with water.

Meanwhile, during production of a silicon material not having Al added thereto, an amount of water corresponding to the water reacted with Al in the precursor of the Al- and O-containing silicon material of the present invention is considered to react with Si to form Si—O bonds. Si that has formed a Si—O bond becomes difficult to occlude and release a charge carrier such as lithium. Therefore, in a silicon material not having Al added thereto, a relatively large amount of Si capable of occluding and releasing a charge carrier such as lithium during charging and discharging is considered to be reduced.

Since Al is present in the Al- and O-containing silicon material of the present invention, the degree of reduction in the amount of Si capable of occluding and releasing a charge carrier such as lithium during charging and discharging is considered to be reduced when compared with a silicon material not having Al added thereto.

Meanwhile, an SEI (Solid Electrolyte Interphase) coating containing oxygen is known to be formed on the surface of a negative electrode active material, as a result of degradation of components of an electrolytic solution under a charging and discharging condition of a secondary battery. Here, when the negative electrode active material is a silicon material containing silicon, silicon in the silicon material is concerned to be oxidized and deteriorated by oxygen contained in the SEI coating.

However, since the Al- and O-containing silicon material of the present invention contains Al, deterioration of silicon due to oxidization is considered to be suppressed. The reason is as follows: Al has a lower electronegativity than silicon, and thus Al is considered to be preferentially and stably bound to oxygen; an Al—O bond between Al and oxygen is more stable than a Si—O bond; and oxygen having formed a stable Al—O bond is considered to be less likely to be involved in oxidization of silicon having a higher electronegativity than Al.

Therefore, a secondary battery including the Al- and O-containing silicon material of the present invention as the negative electrode active material is expected to have a long life.

That a peak indicating Al—O bond is observed in the Al- and O-containing silicon material of the present invention does not mean that all of the Al contained in the Al- and O-containing silicon material of the present invention are bound to oxygen, and, similarly, does not mean that all of the oxygen contained in the Al- and O-containing silicon material of the present invention are bound to Al.

The mass % of O ($W_O$ %) in the Al- and O-containing silicon material of the present invention preferably satisfies $5\leq W_O\leq 30$, more preferably satisfies $10\leq W_O\leq 25$, further preferably satisfies $12\leq W_O\leq 22$, and particularly preferably satisfies $13\leq W_O\leq 21$.

When the Al- and O-containing silicon material of the present invention contains a certain amount of oxygen, the secondary battery including the Al- and O-containing silicon material of the present invention as the negative electrode active material has an extended life.

In the Al- and O-containing silicon material of the present invention, another element may be present in a range not departing from the gist of the present invention. Examples of another element include those derived from raw materials and the production steps. Specifically, examples of another element include Fe, Ca, C, and a halogen.

The mass % of Fe ($W_{Fe}$%) in the Al- and O-containing silicon material of the present invention preferably satisfies $0\leq W_{Fe}\leq 3$, more preferably satisfies $0\leq W_{Fe}\leq 1$, further preferably satisfies $0\leq W_{Fe}\leq 0.5$, particularly preferably satisfies $0\leq W_{Fe}\leq 0.3$, and most preferably satisfies $0\leq W_{Fe}\leq 0.1$. Considering the ease in entry and the difficulty in removal of Fe, a case in which the mass % of Fe ($W_{Fe}$%) in the Al- and O-containing silicon material of the present invention is $0<W_{Fe}$ is assumed.

The relationship between the mass % of Al ($W_{Al}$ %) and the mass % of Fe ($W_{Fe}$ %) preferably satisfies $W_{Al}>W_{Fe}$, and more preferably satisfies $W_{Al}>2\times W_{Fe}$.

The mass % of Ca ($W_{Ca}$ %) in the Al- and O-containing silicon material of the present invention preferably satisfies $0\leq W_{Ca}\leq 3$, more preferably satisfies $0\leq W_{Ca}\leq 1$, further preferably satisfies $0\leq W_{Ca}\leq 0.5$, and particularly preferably satisfies $0\leq W_{Ca}\leq 0.3$. Considering the ease in entry and the difficulty in removal of Ca, a case in which the mass % of Ca ($W_{Ca}$%) in the Al- and O-containing silicon material of the present invention is $0<W_{Ca}$ is assumed.

The mass % of a halogen ($W_X$%) in the Al- and O-containing silicon material of the present invention preferably satisfies more preferably satisfies $0\leq W_X\leq 2$, further preferably satisfies and particularly preferably satisfies $0\leq W_X\leq 0.5$. Considering the ease in entry and the difficulty in removal of a halogen, a case in which the mass % of a halogen ($W_X$ %) in the Al- and O-containing silicon material of the present invention is $0<W_X$ is assumed.

In terms of the structure, the Al- and O-containing silicon material, of the present invention, that has a structure made up of a plurality of plate-like silicon bodies laminated in the thickness direction is preferable. When usage of the Al- and O-containing silicon material of the present invention as an active material of a secondary battery is taken into consideration, for efficient insertion and elimination reactions of a charge carrier such as a lithium ion, the thickness of the plate-like silicon body is preferably in a range of 10 nm to 100 nm, and more preferably in a range of 20 nm to 50 nm. The length in the long axis direction of the plate-like silicon body is preferably in a range of 0.1 µm to 50 µm. Preferably, (length in long axis direction)/(thickness) of the plate-like silicon body is in a range of 2 to 1000.

The Al- and O-containing silicon material of the present invention preferably contains amorphous silicon or silicon crystallites. The size of the silicon crystallite is preferably in a nm order. Specifically, the size of the silicon crystallite is preferably in a range of 0.5 nm to 300 nm, more preferably in a range of 1 nm to 100 nm, further preferably in a range of 1 nm to 50 nm, and particularly preferably in a range of 1 nm to 10 nm. The size of the silicon crystallite is determined by subjecting the Al- and O-containing silicon material of the present invention to an X-ray diffraction measurement (XRD measurement), and calculation by Scherrer's equation using a half width of a diffraction peak of the Si (111) plane in the obtained XRD chart.

The Al- and O-containing silicon material of the present invention is preferably in a particulate form. The mean particle diameter of the Al- and O-containing silicon material of the present invention is preferably in a range of 1 to 30 µm, more preferably in a range of 2 to 20 µm, and further preferably in a range of 3 to 10 µm. The mean particle diameter herein means $D_{50}$ measured by a general laser diffraction type particle size distribution measuring device.

Next, one mode of a method for producing the negative electrode active material including the Al- and O-containing silicon material of the present invention is described.

One mode of a method for producing the negative electrode active material including the Al- and O-containing silicon material of the present invention includes:

a) a step of cooling a molten metal containing Ca, Al, and Si to cause the molten metal to be a solid;

b) a step of reacting the solid with an acid aqueous solution to obtain a precursor of the Al- and O-containing silicon material; and c) a step of heating the precursor at not less than 300° C.

The above production method is suitable for producing the Al- and O-containing silicon material of the present invention having a structure made up of a plurality of plate-like silicon bodies laminated in the thickness direction. Examples of chemical changes in step a), step b), and step c) of the production method represented by ideal reaction formulae, with Al ignored, are as follows:

step a): $Ca + 2Si \rightarrow CaSi_2$ step b): $3CaSi_2 + 6HCl \rightarrow Si_6H_6 + 3CaCl_2$ step c):

The laminated structure, of the Al- and O-containing silicon material of the present invention, made up of a plurality of plate-like silicon bodies laminated in the thickness direction is considered to be derived from Si layers of $CaSi_2$ and $Si_6H_6$.

Step a) is described. As Ca, Al, and Si used in step a), elemental substances or an alloy of these elements are preferably used. $CaSi_2$ may be used as a part of a raw material. The element composition ratio between Ca and Si in the molten metal is preferably in a range of 1:1.5 to 1:2.5, more preferably in a range of 1:1.8 to 1:2.2, and further preferably in a range of 1:1.9 to 1:2.1.

The amount of Al in the molten metal may be determined as appropriate in accordance with the mass ratio of Al in the Al- and O-containing silicon material of the present invention to be produced. However, since Al is easily dissolved in acid, the amount of Al in the precursor is decreased in the next step b) in some cases. Thus, a slightly large amount of Al is preferably added to the molten metal.

Figure 1:
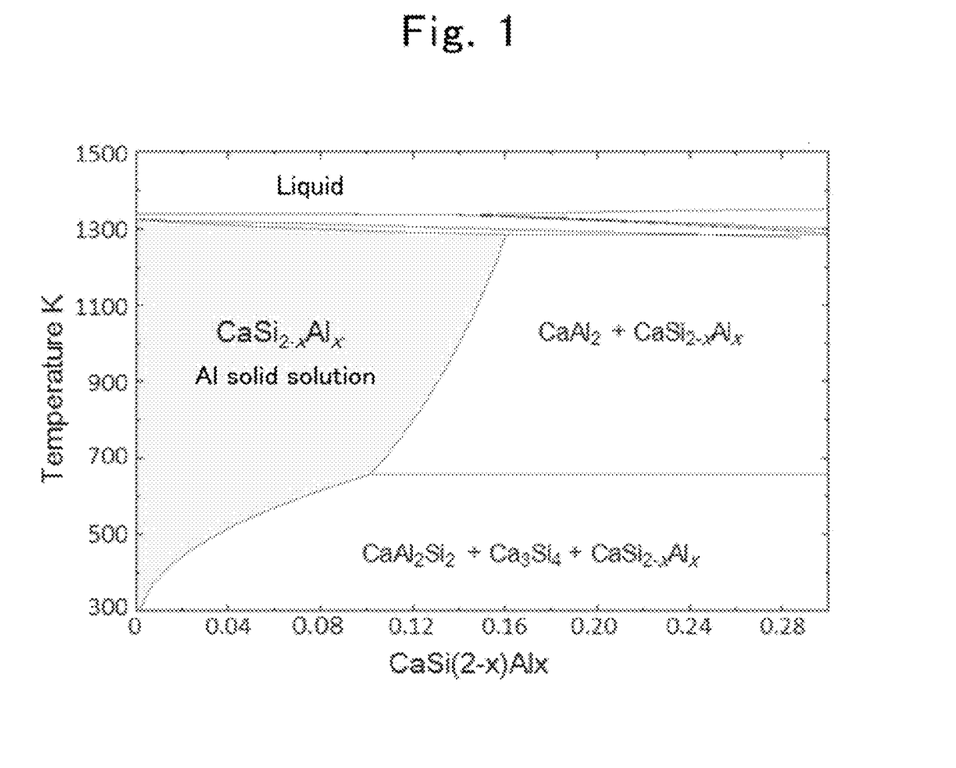
FIG. 1 is a phase diagram of a substitutional solid solution $CaSi_{2-x}Al_x$.

The present inventor considered that $CaSi_{2-x}Al_x$, which is a substitutional solid solution, is produced as a result of Si of $CaSi_2$ being substituted with Al in step a). Then, a phase diagram of the solid solution was calculated using thermodynamic equilibrium calculation software (FactSage, Research Center of Computational Mechanics, Inc.). FIG. 1 shows the phase diagram.

With reference to the phase diagram in FIG. 1, x is in a range of 0<x<0.16. The composition formula for the substitutional solid solution when x=0.16 is $CaSi_{2-0.16}Al_{0.16}$. The mass % of Al relative to the substitutional solid solution is calculated as 100×26.98×0.16/(40.08+28.09×1.84+26.98×0.16)=4.5. However, with reference to the phase diagram in FIG. 1, the amount of Al in the composition formula of the substitutional solid solution at room temperature is significantly low.

Therefore, the mass % of Al relative to the total mass of Ca, Si, and Al in the molten metal is considered to be preferably less than 4.5%, more preferably in a range of 0.01 to 3%, further preferably in a range of 0.05 to 2%, particularly preferably in a range of 0.1 to 1%. When an excessively large amount of Al is added, $CaAl_2Si_2$ is also considered to be generated, but $CaAl_2Si_2$ is degraded and disappears in the next step b).

The molten metal temperature in step a) may be any temperature that allows the mixture of Ca, Al, and Si to be a molten metal. Here, the molten metal means the mixture of Ca, Al, and Si being in a liquid-like state. The molten metal temperature is preferably in a range of 1050° C. to 1800° C., more preferably in a range of 1100° C. to 1500° C., and further preferably in a range of 1200° C. to 1400° C.

Examples of the heater that is used in step a) include a high-frequency induction heater, an electric furnace, and a gas furnace. Step a) may be performed under a pressurizing or reduced pressure condition, or may be performed in an atmosphere of inert gas such as argon, helium, or nitrogen.

When the molten metal is to be cooled, the temperature is preferably reduced at a greatest possible speed. The reason is that generation of an interstitial solid solution as well as generation of a substitutional solid solution are expected. As the method for cooling the molten metal, a method in which the molten metal is poured in a predetermined mold and left to stand at room temperature may be employed, or a cooling method using a rapid cooling device may be employed.

The rapid cooling device described herein does not include a device that cools a molten metal by leaving the molten metal to stand, but denotes a device that compulsorily cools the molten metal. Examples of the rapid cooling device include cooling devices using cooling means that jets a molten metal on a rotating cooling roll (so-called a melt-spun method, a strip casting method, or a melt spinning method), or cooling means that employs an atomizing method in which a fluid is sprayed to a molten metal in the form of a thin stream. Examples of the atomizing method include a gas atomizing method, a water atomizing method, a centrifugal atomizing method, and a plasma atomizing method. Specific examples of the rapid cooling device include a liquid rapid solidifying device, a rapid cooling thin section producing device, a submerged spinning device, a gas atomizing device, a water atomizing device, a rotary disc device, a rotational electrode method device (these are available from NISSIN GIKEN Co., Ltd.), a liquid rapid cooling device, and a gas atomizing device (these are available from MAKABE Technical Research Co., Ltd.). Examples of a preferable cooling speed include 1000 to 100000° C./second.

An annealing step of performing heating while maintaining the solid state of the solid obtained through cooling may be added. From the phase diagram in FIG. 1, the substitutional solid solution $CaSi_{2-x}Al_x$ is considered to be most easily generated around 900° C. The heating temperature in the annealing step is preferably 800 to 1000° C. and more preferably 850 to 950° C. Examples of the heating time include 1 to 50 hours and 5 to 30 hours. As a matter of course, the solid is cooled after the annealing step.

The solid obtained through cooling may be ground or may be further classified.

Next, step b) is described. Step b) is a step of reacting the solid obtained in step a) with an acid aqueous solution to obtain a precursor of the Al- and O-containing silicon material. The precursor of the Al- and O-containing silicon material is in a layered form because the basic skeleton of the Si layer by $CaSi_{2-x}Al_x$ and $CaSi_2$ is maintained.

Examples of the acid include hydrofluoric acid, hydrochloric acid, hydrobromic acid, hydroiodic acid, sulfuric acid, nitric acid, phosphoric acid, formic acid, acetic acid, methanesulfonic acid, tetrafluoroboric acid, hexafluorophosphoric acid, hexafluoroarsenic acid, fluoroantimonic acid, hexafluorosilicic acid, hexafluorogermanic acid, hexafluorostannic (IV) acid, trifluoroacetic acid, hexafluorotitanic acid, hexafluorozirconic acid, trifluoromethanesulfonic acid, and fluorosulfonic acid. These acids may be used individually or in combination.

In step b), the acid is preferably used in an excessive amount in mole ratio, compared with Ca contained in the solid obtained in step a).

Step b) is performed using an acid aqueous solution. The reason is that use of water as a solvent facilitates separation of the target substance and removal of a by-product such as $CaCl_2$. As for the reaction condition of the step, a reduced pressure condition such as in a vacuum, or an inert gas atmosphere condition is preferred, and a temperature condition not higher than room temperature such as in an ice bath is preferred. The reaction time of the step is appropriately set.

An ideal reaction formula in step b) when the substitutional solid solution $CaSi_{2-x}Al_x$ has been produced in step a) is considered to be represented as follows.

$$3CaSi_{2-x}Al_x + 6HCl \rightarrow Si_{6-3x}Al_{3x}H_6 + 3CaCl_2$$

Step b) is performed using an acid aqueous solution, and the Al—H bond and the Si—H bond formed according to the reaction formula described in the previous paragraph are capable of reacting with water. Thus, in step b), for example, the following reaction is considered to proceed.

$$Si_{6-3x}Al_{3x}H_6 + 3H_2O \rightarrow Si_{6-3x}Al_{3x}H_3(OH)_3 + 3H_2\uparrow$$

Therefore, oxygen is contained in the precursor of the Al- and O-containing silicon material. In addition, elements derived from anions of the acid having been used may also be contained.

Next, step c) is described. Step c) is a step of heating the precursor of the Al- and O-containing silicon material at not less than 300° C. to remove hydrogen, water, and the like, thereby obtaining the Al- and O-containing silicon material.

Step c) is preferably performed in a non-oxidizing atmosphere containing less oxygen than a normal atmosphere. Examples of the non-oxidizing atmosphere include a reduced pressure atmosphere including a vacuum, and an inert gas atmosphere. The heating temperature is preferably in a range of 350° C. to 950° C., and more preferably in a range of 400° C. to 900° C. If the heating temperature is too low, hydrogen is not sufficiently removed in some cases, whereas if the heating temperature is too high, the energy is wasted. The heating time is appropriately set in accordance with the heating temperature. Preferably, the heating time is determined while the amount of hydrogen leaving the reaction system is measured. If the heating temperature and the heating time are appropriately selected, the ratio between amorphous silicon and silicon crystallites contained in the Al- and O-containing silicon material to be produced, and the size of the silicon crystallites, are adjusted. If the heating temperature and the heating time are appropriately selected, the form of the layer having a thickness in a nm order and including amorphous silicon and silicon crystallites contained in the Al- and O-containing silicon material to be produced is adjusted.

The obtained Al- and O-containing silicon material may be ground or may be further classified.

The Al- and O-containing silicon material of the present invention is used for a negative electrode active material of power storage devices including secondary batteries such as lithium ion secondary batteries, electric double layer capacitors, and lithium ion capacitors. The Al- and O-containing silicon material of the present invention is also used, for example, as a material for CMOS, semiconductor memories, solar batteries, etc., or as a photocatalyst material, etc.

In the following, as a representative example of power storage devices, a lithium ion secondary battery of the present invention including the Al- and O-containing silicon material of the present invention as a negative electrode active material is described. Specifically, the lithium ion secondary battery of the present invention includes a positive electrode, a negative electrode including the Al- and O-containing silicon material of the present invention as a negative electrode active material, an electrolytic solution, and a separator.

The positive electrode has a current collector, and a positive electrode active material layer bound to the surface of the current collector.

The current collector refers to a chemically inert electronic conductor for continuously sending a flow of current to the electrode during discharging and charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector may take forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

The positive electrode active material layer includes a positive electrode active material, and if necessary, a conductive additive and/or a binding agent.

Examples of the positive electrode active material include layered compounds that are $Li_aNi_bCo_cMn_dD_eO_f$ (0.2≤a≤2; b+c+d+e=1; 0≤e<1; D is at least one element selected from Li, Fe, Cr, Cu, Zn, Ca, Mg, S, Si, Na, K, Al, Zr, Ti, P, Ga, Ge, V, Mo, Nb, W, or La; 1.7≤f≤3), $Li_aNi_bCo_cAl_dD_eO_f$ ($0.2 \leq a \leq 2$; $b+c+d+e=1$; $0 \leq e<1$; D is at least one element selected from Li, Fe, Cr, Cu, Zn, Ca, Mg, S, Si, Na, K, Zr, Ti, P, Ga, Ge, V, Mo, Nb, W, or La; $1.7 \leq f \leq 3$), and $Li_2MnO_3$. Additional examples of the positive electrode active material include a spinel such as $LiMn_2O_4$, a solid solution formed as a mixture of a spinel and a layered compound, and polyanion-based compounds represented by $LiMPO_4$, $LiMVO_4$, or $Li_2MSiO_4$ (where "M" is selected from at least one of Co, Ni, Mn, or Fe), or the like. Further additional examples of the positive electrode active material include tavorite-based compounds represented by $LiMPO_4F$ ("M" is a transition metal) such as $LiFePO_4F$ and borate-based compounds represented by $LiMBO_3$ ("M" is a transition metal) such as $LiFeBO_3$. Any metal oxide used as the positive electrode active material only needs to have a basic composition of the composition formulae described above, and those in which a metal element included in the basic composition is substituted with another metal element are also used as the positive electrode active material. In addition, as the positive electrode active material, a material for the positive electrode active material not containing lithium ion contributing to the charging and discharging, such as elemental substance sulfur, a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate-based materials such as conjugate diacetic acid-based organic matters, and other known materials, may be used. Furthermore, a compound having a stable radical such as nitroxide, nitronyl nitroxide, galvinoxyl, and phenoxyl may be employed as the positive electrode active material. When a material for the positive electrode active material not containing lithium is used, an ion has to be added in advance to the positive electrode and/or the negative electrode using a known method. For adding the ion, a metal or a compound containing the ion may be used.

The conductive additive is added for increasing conductivity of the electrode. Thus, the conductive additive is preferably added optionally when conductivity of the electrode is insufficient, and may not necessarily be added when conductivity of the electrode is sufficiently good. As the conductive additive, a fine electronic conductor that is chemically inert may be used, and examples thereof include carbonaceous fine particles such as carbon black, graphite, acetylene black, Ketjen black (registered trademark), vapor grown carbon fiber, and various metal particles. These conductive additives may be individually added to the active material layer, or a combination of two or more of these conductive additives may be added to the active material layer.

The blending ratio of the conductive additive in the active material layer in mass ratio, i.e., active material:conductive additive, is preferably 1:0.005 to 1:0.5, more preferably 1:0.01 to 1:0.2, and further preferably 1:0.03 to 1:0.1. The reason is that if the conductive additive is too little, efficient conducting paths are not formed, whereas if the conductive additive is too much, moldability of the active material layer deteriorates and energy density of the electrode becomes low.

The binding agent serves to adhere the active material, the conductive additive, or the like, to the surface of the current collector, and maintains the conductive network in the electrode. Examples of the binding agent include a fluorine-containing resin such as polyvinylidene fluoride, polytetrafluoroethylene, or fluororubber, a thermoplastic resin such as polypropylene or polyethylene, an imide-based resin such as polyimide or polyamide-imide, an alkoxysilyl group-containing resin, an acrylic resin such as poly(meth)acrylic acid, styrene-butadiene rubber (SBR), carboxymethyl cellulose, an alginate such as sodium alginate or ammonium alginate, a water-soluble cellulose ester crosslinked product, and starch-acrylic acid graft polymer. These binding agents may be employed individually or in a plural number.

A crosslinked polymer in which a carboxyl group-containing polymer such as polyacrylic acid or polymethacrylic acid is crosslinked by a polyamine such as a diamine, as disclosed in International Publication WO 2016/063882, may be used as the binding agent.

Examples of the diamine used in the crosslinked polymer include an alkylenediamine such as ethylenediamine, propylenediamine, or hexamethylenediamine, a saturated carbon ring-containing diamine such as 1,4-diaminocyclohexane, 1,3-diaminocyclohexane, isophoronediamine, or bis(4-aminocyclohexyl)methane, and an aromatic diamine such as m-phenylenediamine, p-phenylenediamine, 4,4'-diaminodiphenyl methane, 4,4'-diaminodiphenyl ether, bis(4-aminophenyl)sulfone, benzidine, o-tolidine, 2,4-tolylenediamine, 2,6-tolylenediamine, xylylenediamine, or naphthalenediamine.

The blending ratio of the binding agent in the active material layer in mass ratio, i.e., active material:binding agent, is preferably 1:0.001 to 1:0.3, more preferably 1:0.005 to 1:0.2, and further preferably 1:0.01 to 1:0.15. The reason is that if the binding agent is too little, the moldability of the electrode deteriorates, whereas if the binding agent is too much, energy density of the electrode becomes low.

The negative electrode has a current collector, and a negative electrode active material layer bound to the surface of the current collector. Regarding the current collector, those described for the positive electrode may be suitably employed as appropriate. The negative electrode active material layer includes a negative electrode active material, and, if necessary, a conductive additive and/or a binding agent.

As the negative electrode active material, only the Al- and O-containing silicon material of the present invention may be employed, or the Al- and O-containing silicon material of the present invention and a known negative electrode active material may be used in combination. The Al- and O-containing silicon material of the present invention coated with carbon may be used as the negative electrode active material.

In a carbon-coated Al- and O-containing silicon material as one mode of the Al- and O-containing silicon material of the present invention, the mass % of C ($W_C$ %) preferably satisfies $0<W_C \leq 30$, more preferably satisfies $1 \leq W_C \leq 20$, further preferably satisfies $2 \leq W_C \leq 15$, and particularly preferably satisfies $5 \leq W_C \leq 10$.

Regarding the conductive additive and the binding agent to be used in the negative electrode, those described for the positive electrode may be suitably employed as appropriate in the blending ratio as described above.

In order to form the active material layer on the surface of the current collector, the active material may be applied on the surface of the current collector using a known conventional method such as a roll coating method, a die coating method, a dip coating method, a doctor blade method, a spray coating method, and a curtain coating method. Specifically, an active material, a solvent, and if necessary, a binding agent and/or a conductive additive are mixed to prepare a slurry. Examples of the solvent include N-methyl-2-pyrrolidone, methanol, methyl isobutyl ketone, and water. The slurry is applied on the surface of the current collector, and then dried. In order to increase the electrode density, compression may be performed after drying.

The electrolytic solution contains a nonaqueous solvent and an electrolyte dissolved in the nonaqueous solvent.

Examples of the nonaqueous solvent include cyclic esters, linear esters, and ethers. Examples of the cyclic esters include ethylene carbonate, propylene carbonate, butylene carbonate, fluoroethylene carbonate, gamma butyrolactone, vinylene carbonate, 2-methyl-gamma butyrolactone, acetyl-gamma butyrolactone, and gamma valerolactone. Examples of the linear esters include dimethyl carbonate, diethyl carbonate, dibutyl carbonate, dipropyl carbonate, ethylmethyl carbonate, propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. As the nonaqueous solvent, compounds in which part or all of hydrogens in the chemical structure of the specific solvents are substituted with fluorine may be employed.

Examples of the electrolyte include lithium salts such as $LiClO_4$, $LiAsF_6$, $LiPF_6$, $LiBF_4$, $LiCF_3SO_3$, and $LiN(CF_3SO_2)_2$.

Examples of the electrolytic solution include solutions prepared by dissolving a lithium salt such as $LiClO_4$, $LiPF_6$, $LiBF_4$, or $LiCF_3SO_3$ in a nonaqueous solvent such as fluoroethylene carbonate, ethylmethyl carbonate, ethylene carbonate, dimethyl carbonate, propylene carbonate, or diethyl carbonate at a concentration of about 0.5 mol/L to 3 mol/L.

The separator is for separating the positive electrode and the negative electrode to allow passage of lithium ions while preventing short circuit due to a contact of both electrodes. Examples of the separator include porous materials, non-woven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

Next, a method for producing a lithium ion secondary battery is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution to the electrode assembly. In addition, the lithium ion secondary battery of the present invention preferably executes charging and discharging in a voltage range suitable for the types of active materials contained in the electrodes.

The form of the lithium ion secondary battery of the present invention is not limited in particular, and various forms such as a cylindrical type, a square type, a coin type, a laminated type, etc., are employed.

The lithium ion secondary battery of the present invention may be mounted on a vehicle. The vehicle may be a vehicle that uses, as all or a part of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charging stations for electric vehicles.

Although embodiments of the present invention have been described above, the present invention is not limited to the embodiments. Without departing from the gist of the present invention, the present invention is implemented in various modes with modifications and improvements, etc., that are made by a person skilled in the art.

EXAMPLES

In the following, the present invention is specifically described by presenting Examples, Comparative Examples, and the like. The present invention is not limited to these Examples.

Example 1

An Al- and O-containing silicon material and a lithium ion secondary battery of Example 1 were produced in the following manner.

Step a)

Ca, Al, and Si were weighed out in a carbon crucible. The element composition ratio between Ca and Si was 1:2, and the added amount of Al was set to be 1% of the total mass of Ca, Al, and Si. The carbon crucible was placed in a high-frequency induction heater and heated at around 1300° C. in an argon gas atmosphere, to produce a molten metal containing Ca, Al, and Si. The molten metal was poured into a predetermined mold, thereby being cooled to be a solid. The solid was ground into a powder form, and the resultant powder solid was subjected to step b).

Step b)

The powder solid obtained in step a) was added to 17 wt % hydrochloric acid at 0° C. in a nitrogen gas atmosphere, and the mixture was stirred. The reaction liquid was filtered, and the residue was washed with distilled water and methanol, and further, dried under a reduced pressure at room temperature, to obtain a precursor of an Al- and O-containing silicon material.

Step c)

The precursor of the Al- and O-containing silicon material was heated for 1 hour at 900° C. in a nitrogen gas atmosphere, to produce an Al- and O-containing silicon material of Example 1.

A negative electrode of Example 1 and a lithium ion secondary battery of Example 1 were produced in the following manner, using the Al- and O-containing silicon material of Example 1.

A polyacrylic acid having a weight-average molecular weight of 800000 was dissolved in N-methyl-2-pyrrolidone, to produce a polyacrylic acid solution containing 10 mass % of the polyacrylic acid. In addition, 0.2 g (1.0 mmol) of 4,4'-diaminodiphenyl methane was dissolved in 0.4 mL of N-methyl-2-pyrrolidone, to produce a 4,4'-diaminodiphenyl methane solution. Under a stirring condition, the entire amount of the 4,4'-diaminodiphenyl methane solution was dropped into 7 mL of the polyacrylic acid solution (corresponding to 9.5 mmol in terms of acrylic acid monomer), and the obtained mixture was stirred for 30 minutes at room temperature. Then, using a Dean-Stark apparatus, the mixture was stirred for 3 hours at 130° C. to allow dehydration reaction to proceed, whereby a binding agent solution was produced.

72.5 parts by mass of the Al- and O-containing silicon material of Example 1 as the negative electrode active material; 13.5 parts by mass of acetylene black as the conductive additive; an amount of the above binding agent solution containing 14 parts by mass of a solid content, as the binding agent; and an appropriate amount of N-methyl-2-pyrrolidone, were mixed to produce a slurry. A copper foil was prepared as the negative electrode current collector. On the surface of the copper foil, the slurry was applied in a film form by using a doctor blade. The copper foil on which the slurry was applied was dried for 15 minutes at 80° C., to remove N-methyl-2-pyrrolidone. Then, the resultant copper foil was pressed, and heated for 30 minutes at 180° C. in an atmosphere under a reduced pressure by a vacuum pump, whereby a negative electrode of Example 1 having a negative electrode active material layer formed thereon was produced.

96 parts by mass of $LiNi_{82/100}Co_{15/100}Al_{3/100}O_2$ as the positive electrode active material, 2 parts by mass of acetylene black as the conductive additive, 2 parts by mass of polyvinylidene fluoride as the binding agent, and an appropriate amount of N-methyl-2-pyrrolidone were mixed to produce a slurry. An aluminum foil was prepared as the positive electrode current collector. On the surface of the aluminum foil, the slurry was applied in a film form by using a doctor blade. The aluminum foil on which the slurry was applied was dried for 20 minutes at 80° C., to remove N-methyl-2-pyrrolidone. Then, the resultant aluminum foil was pressed, and heated for 6 hours at 120° C. in an atmosphere under a reduced pressure by a vacuum pump, whereby a positive electrode having a positive electrode active material layer was formed on the surface of the current collector was produced.

A porous film made from polyethylene was prepared as the separator. A solution in which $LiPF_6$ was dissolved at a concentration of 2 mol/L in a mixed solvent obtained by mixing fluoroethylene carbonate and ethylmethyl carbonate at a volume ratio of 19:81 was used as the electrolytic solution.

The negative electrode of Example 1, the separator, and the positive electrode were laminated in this order, to obtain a laminated body. The laminated body and the electrolytic solution were put into a bag made from a laminate film, and the bag was sealed to produce a lithium ion secondary battery of Example 1.

Comparative Example 1

A silicon material of Comparative Example 1, a negative electrode of Comparative Example 1, and a lithium ion secondary battery of Comparative Example 1 were produced using a similar method to that in Example 1 except that Al was not added in step a).

Evaluation Example 1

Elemental analyses were performed on the Al- and O-containing silicon material of Example 1 and the silicon material of Comparative Example 1, using an inductively coupled plasma emission spectrophotometer (ICP-AES). The results of the elemental analyses revealed that: in the Al- and O-containing silicon material of Example 1, the mass % of Al was 0.25% and the mass % of Fe was 0%; and in the silicon material of Comparative Example 1, the mass % of Al was 0% and the mass % of Fe was 0%.

Evaluation Example 2

The SOC (State of Charge) of the lithium ion secondary battery of Example 1 was adjusted to 15% in a temperature controlled bath at 25° C. Then, the lithium ion secondary battery was discharged for 10 seconds with a constant current at 1 C rate. The amount of change in voltage before and after the discharging was divided by the current value, to calculate a resistance. A similar test was performed also on the lithium ion secondary battery of Comparative Example 1.

The resistance of the lithium ion secondary battery of Example 1 was 3.3Ω, and the resistance of the lithium ion secondary battery of Comparative Example 1 was 3.6Ω. Use of the Al- and O-containing silicon material was confirmed to reduce the resistance of the lithium ion secondary battery.

Example 2

An Al- and O-containing silicon material, a negative electrode, and a lithium ion secondary battery of Example 2 were produced in the following manner.

Step a)

Ca, Al, and Si were weighed out in a carbon crucible. The element composition ratio between Ca and Si was 1:2, and the added amount of Al was set to be 1% of the total mass of Ca, Al, and Si. The carbon crucible was placed in a high-frequency induction heater and heated at around 1300° C. in an argon gas atmosphere, to produce a molten metal containing Ca, Al, and Si. The molten metal was poured into a predetermined mold, thereby being cooled to be a solid. The solid was ground into a powder form, and the resultant powder solid was subjected to step b).

Step b)

The powder solid obtained in step a) was added to 17 wt % hydrochloric acid at 0° C. in a nitrogen gas atmosphere, and the mixture was stirred. The reaction liquid was filtered, and the residue was washed with distilled water and methanol, and further, dried under a reduced pressure at room temperature, to obtain a precursor of an Al- and O-containing silicon material.

Step c)

The precursor of the Al- and O-containing silicon material was heated for 1 hour at 900° C. in a nitrogen gas atmosphere, to produce an Al- and O-containing silicon material of Example 2.

A negative electrode of Example 2 and a lithium ion secondary battery of Example 2 were produced in the following manner, using the Al- and O-containing silicon material of Example 2.

A polyacrylic acid having a weight-average molecular weight of 800000 was dissolved in N-methyl-2-pyrrolidone, to produce a polyacrylic acid solution containing 10 mass % of the polyacrylic acid. In addition, 0.2 g (1.0 mmol) of 4,4'-diaminodiphenyl methane was dissolved in 0.4 mL of N-methyl-2-pyrrolidone, to produce a 4,4'-diaminodiphenyl methane solution. Under a stirring condition, the entire amount of the 4,4'-diaminodiphenyl methane solution was dropped into 7 mL of the polyacrylic acid solution (corresponding to 9.5 mmol in terms of acrylic acid monomer), and the obtained mixture was stirred for 30 minutes at room temperature. Then, using a Dean-Stark apparatus, the mixture was stirred for 3 hours at 130° C. to allow dehydration reaction to proceed, whereby a binding agent solution was produced.

72.5 parts by mass of the Al- and O-containing silicon material of Example 2 as the negative electrode active material; 13.5 parts by mass of acetylene black as the conductive additive; an amount of the above binding agent solution containing 14 parts by mass of a solid content, as the binding agent; and an appropriate amount of N-methyl-2-pyrrolidone, were mixed to produce a slurry. A copper foil was prepared as the negative electrode current collector. On the surface of the copper foil, the slurry was applied in a film form by using a doctor blade. The copper foil on which the slurry was applied was dried for 15 minutes at 80° C., to remove N-methyl-2-pyrrolidone. Then, the resultant copper foil was pressed, and heated for 30 minutes at 180° C. in an atmosphere under a reduced pressure by a vacuum pump, whereby a negative electrode of Example 2 having a negative electrode active material layer formed thereon was produced.

The negative electrode of Example 2 was cut so as to have a diameter of 11 mm, to obtain an evaluation electrode. A metal lithium foil having a thickness of 500 μm was cut so as to have a diameter of 13 mm, to obtain a counter electrode. As the separator, a glass filter (Hoechst Celanese) and Celgard 2400 (Polypore Inc.), which was a monolayer polypropylene, were prepared. An electrolytic solution in which $LiPF_6$ was dissolved at a concentration of 1 mol/L in a mixed solvent obtained by mixing ethylene carbonate and diethyl carbonate at a volume ratio of 1:1 was prepared. The two types of separators were sandwiched between the counter electrode and the evaluation electrode in the order of the counter electrode, the glass filter, the Celgard 2400, and the evaluation electrode, to obtain an electrode assembly. The electrode assembly was housed in a coin type battery case CR2032 (Hohsen Corp.), and further, the electrolytic solution was injected, whereby a coin type battery was obtained. The coin type battery was used as the lithium ion secondary battery of Example 2.

Example 3

An Al- and O-containing silicon material, a negative electrode, and a lithium ion secondary battery of Example 3 were produced using a similar method to that in Example 2 except that: the production scale was increased; and a carbon coating step described below was added after step c) to obtain a carbon-coated Al- and O-containing silicon material as the Al- and O-containing silicon material of Example 3, and the carbon-coated Al- and O-containing silicon material was used as the negative electrode active material.

Carbon Coating Step

The Al- and O-containing silicon material having been subjected to step c) was placed in a rotary kiln type reactor, and was subjected to thermal CVD under a flow of propane-argon mixed gas under conditions of 880° C. and a retention time of 60 minutes, to obtain a carbon-coated Al- and O-containing silicon material.

Example 4

$CaSi_2$ in a powder form containing Al and Fe as impurities was prepared. An elemental analysis performed on the $CaSi_2$ using an ICP-AES revealed that 38 mass % of Ca was contained, 57 mass % of Si was contained, 4 mass % of Fe was contained, and 1 mass % of Al was contained.

An Al- and O-containing silicon material, a negative electrode, and a lithium ion secondary battery of Example 4 were produced using a similar method to that in Example 3 except that the step b) and the subsequent steps were performed using the $CaSi_2$.

Comparative Example 2

A silicon material, a negative electrode, and a lithium ion secondary battery of Comparative Example 2 were produced using a similar method to that in Example 2 except that Al was not added in step a).

Comparative Example 3

A silicon material, a negative electrode, and a lithium ion secondary battery of Comparative Example 3 were produced using a similar method to that in Example 2 except that Al was not added and Fe was added in step a).

In step a), Fe was added by an amount corresponding to 4% of the total mass of Ca, Fe, and Si.

Evaluation Example 3

Using an X-ray fluorescence (XRF) analyzer, elemental analyses were performed on the Al- and O-containing silicon materials of Example 2 to Example 4 and the silicon materials of Comparative Example 2 and Comparative Example 3. In addition, using an oxygen-nitrogen-hydrogen analyzer, elemental analyses for oxygen were performed on the Al- and O-containing silicon materials of Example 2 to Example 4 and the silicon materials of Comparative Example 2 and Comparative Example 3. Further, using a carbon-sulfur analyzer, elemental analyses for carbon were performed on the carbon-coated Al- and O-containing silicon materials of Example 3 and Example 4.

Table 1 shows results of these elemental analyses in terms of mass %. The reason for the presence of small amounts of Fe in Example 2, Example 3, and Comparative Example 2 is that Fe was contained as an impurity in a raw material metal. O, Ca, and Cl contained in all the silicon materials are derived from the solvent (water), raw materials, anions of acids, and the like used in the production.

TABLE 1

| | Si | O | C | Fe | Al | Ca | Cl |
|---|---|---|---|---|---|---|---|
| Example 2 | 83.1 | 14.5 | — | 0.14 | 0.37 | 0.22 | 1.63 |
| Example 3 | 77 | 15.9 | 5.8 | 0.18 | 0.28 | 0.14 | 0.69 |
| Example 4 | 69.1 | 16.9 | 8 | 5 | 0.2 | 0.3 | 0.5 |
| Comparative Example 2 | 83.2 | 14.2 | — | 0.02 | 0 | 0.91 | 1.49 |
| Comparative Example 3 | 72.3 | 17.5 | — | 4.9 | 0 | 0.61 | 1.67 |

Evaluation Example 4

The X-ray diffraction of the Al- and O-containing silicon material of Example 2 was measured by a powder X-ray diffraction device. As a result, a peak derived from silicon crystallites was confirmed in an X-ray diffraction chart of the Al- and O-containing silicon material of Example 2.

Evaluation Example 5

For each of the lithium ion secondary batteries of Example 2 to Example 4, Comparative Example 2, and Comparative Example 3, the first charging and discharging comprising: discharging down to 0.01 V with a current of 0.2 mA; and subsequent charging up to 0.8 V with a current of 0.2 mA, was performed.

Further, for each of the lithium ion secondary batteries of Example 2, Comparative Example 2, and Comparative Example 3 after the first charging and discharging, a charging and discharging cycle of discharging down to 0.01 V with a current of 0.5 mA and then charging up to 1.0 V with a current of 0.5 mA was performed multiple times.

The initial efficiency and the capacity retention rate were calculated according to the formulae below.

Initial efficiency (%)=100×(first charge capacity)/(first discharge capacity)

Capacity retention rate (%)=100×(charge capacity at each cycle)/(charge capacity at the first cycle)

Figure 2:
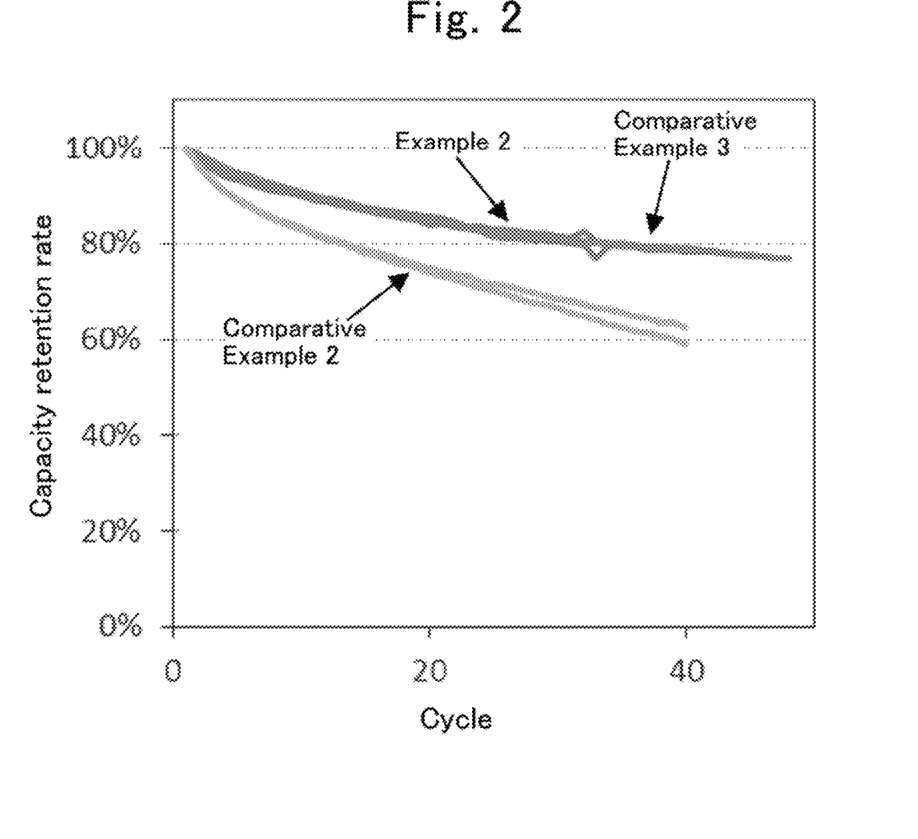
FIG. 2 is a graph showing results (N=2) of capacity retention rates of lithium ion secondary batteries of Example 2, Comparative Example 2, and Comparative Example 3.

Table 2 shows the results of the first discharge capacity, the first charge capacity, and the initial efficiency, together with some of results of the elemental analyses. FIG. 2 shows the results (N=2) of the capacity retention rate.

TABLE 2

| | C | Fe | Al | First discharge capacity (mAh/g) | First charge capacity (mAh/g) | Initial efficiency (%) |
|---|---|---|---|---|---|---|
| Example 2 | — | 0.14 | 0.37 | 2087 | 1686 | 80.8 |
| Example 3 | 5.8 | 0.18 | 0.28 | 2005 | 1641 | 81.8 |
| Example 4 | 8 | 5 | 0.2 | 1835 | 1442 | 78.6 |
| Comparative Example 2 | — | 0.02 | 0 | 2058 | 1661 | 80.7 |
| Comparative Example 3 | — | 4.9 | 0 | 1777 | 1336 | 75.2 |

From the results shown in Table 2, the first discharge capacity, the first charge capacity, and the initial efficiency are considered to be reduced due to the presence of Fe. From the results shown in FIG. 2, in terms of the capacity retention rate, presence of Al and Fe is considered to be preferable. When these results are comprehensively considered, in the Al- and O-containing silicon material of the present invention, a smaller existence amount of Fe is considered to be preferable, and a larger existence amount of Al is considered to be preferable.

Example 5

An Al- and O-containing silicon material, a negative electrode, and a lithium ion secondary battery of Example 5 were produced in the following manner.

Step a)

Ca, Al, and Si were weighed out in a carbon crucible. The element composition ratio between Ca and Si was 1:2, and the added amount of Al was set to be 0.1% of the total mass of Ca, Al, and Si. The carbon crucible was placed in a high-frequency induction heater and heated at around 1300° C. in an argon gas atmosphere, to produce a molten metal containing Ca, Al, and Si. The molten metal was poured into a predetermined mold, thereby being cooled to be a solid. The solid was ground into a powder form, and the resultant powder solid was subjected to step b).

Step b)

The powder solid obtained in step a) was added to 17 wt % hydrochloric acid at 0° C. in a nitrogen gas atmosphere, and the mixture was stirred. The reaction liquid was filtered, and the residue was washed with distilled water and methanol, and further, dried under a reduced pressure at room temperature, to obtain a precursor of an Al- and O-containing silicon material.

Step c)

The precursor of the Al- and O-containing silicon material was heated for 1 hour at 900° C. in a nitrogen gas atmosphere, to produce an Al- and O-containing silicon material of Example 5.

A negative electrode of Example 5 and a lithium ion secondary battery of Example 5 were produced in the following manner, using the Al- and O-containing silicon material of Example 5.

A polyacrylic acid having a weight-average molecular weight of 800000 was dissolved in N-methyl-2-pyrrolidone, to produce a polyacrylic acid solution containing 10 mass % of the polyacrylic acid. In addition, 0.2 g (1.0 mmol) of 4,4'-diaminodiphenyl methane was dissolved in 0.4 mL of N-methyl-2-pyrrolidone, to produce a 4,4'-diaminodiphenyl methane solution. Under a stirring condition, the entire amount of the 4,4'-diaminodiphenyl methane solution was dropped into 7 mL of the polyacrylic acid solution (corresponding to 9.5 mmol in terms of acrylic acid monomer), and the obtained mixture was stirred for 30 minutes at room temperature. Then, using a Dean-Stark apparatus, the mixture was stirred for 3 hours at 130° C. to allow dehydration reaction to proceed, whereby a binding agent solution was produced.

72.5 parts by mass of the Al- and O-containing silicon material of Example 5 as the negative electrode active material; 13.5 parts by mass of acetylene black as the conductive additive; an amount of the above binding agent solution containing 14 parts by mass of a solid content, as the binding agent; and an appropriate amount of N-methyl-2-pyrrolidone, were mixed to produce a slurry. A copper foil was prepared as the negative electrode current collector. On the surface of the copper foil, the slurry was applied in a film form by using a doctor blade. The copper foil on which the slurry was applied was dried for 15 minutes at 80° C., to remove N-methyl-2-pyrrolidone. Then, the resultant copper foil was pressed, and heated for 30 minutes at 180° C. in an atmosphere under a reduced pressure by a vacuum pump, whereby a negative electrode of Example 5 having a negative electrode active material layer formed thereon was produced.

The negative electrode of Example 5 was cut so as to have a diameter of 11 mm, to obtain an evaluation electrode. A metal lithium foil having a thickness of 500 μm was cut so as to have a diameter of 13 mm, to obtain a counter electrode. As the separator, a glass filter (Hoechst Celanese) and Celgard 2400 (Polypore Inc.), which was a monolayer polypropylene, were prepared. An electrolytic solution in which $LiPF_6$ was dissolved at a concentration of 1 mol/L in a mixed solvent obtained by mixing ethylene carbonate and diethyl carbonate at a volume ratio of 1:1 was prepared. The two types of separators were sandwiched between the counter electrode and the evaluation electrode in the order of the counter electrode, the glass filter, the Celgard 2400, and the evaluation electrode, to obtain an electrode assembly. The electrode assembly was housed in a coin type battery case CR2032 (Hohsen Corp.), and further, the electrolytic solution was injected, whereby a coin type battery was obtained. The coin type battery was used as the lithium ion secondary battery of Example 5.

Example 6

An Al- and O-containing silicon material, a negative electrode, and a lithium ion secondary battery of Example 6 were produced using a similar method to that in Example 5 except that the added amount of Al was set to be 0.3% of the total mass of Ca, Al, and Si in step a).

Example 7

An Al- and O-containing silicon material, a negative electrode, and a lithium ion secondary battery of Example 7 were produced using a similar method to that in Example 5 except that the added amount of Al was set to be 0.5% of the total mass of Ca, Al, and Si in step a).

Example 8

An Al- and O-containing silicon material, a negative electrode, and a lithium ion secondary battery of Example 8 were produced using a similar method to that in Example 5 except that the added amount of Al was set to be 1% of the total mass of Ca, Al, and Si in step a).

Example 9

An Al- and O-containing silicon material, a negative electrode, and a lithium ion secondary battery of Example 9 were produced using a similar method to that in Example 8 except that an annealing step described below was added in step a).

Annealing Step

A cooled solid containing Ca, Al, and Si was heated for 24 hours at 900° C. in a nitrogen atmosphere, and then cooled. The cooled solid containing Ca, Al, and Si was ground into a powder form, and the resultant powder solid was subjected to step b).

Evaluation Example 6

Elemental analyses were performed on the Al- and O-containing silicon materials of Example 5 to Example 9 using a similar method to that in Evaluation Example 3. Table 3 shows the results of the elemental analyses in terms of mass %. The reason for the presence of a small amount of Fe in the Al- and O-containing silicon material of each Example is that Fe was contained as an impurity in a raw material metal. Cl, Ca, C, and O contained in the Al- and O-containing silicon material of each Example are derived from anions in acids, raw materials, carbon crucibles, solvent (water), and the like used in the production.

TABLE 3

| | Feature of production method | Si | Cl | Ca | Al | Fe | C | O |
|---|---|---|---|---|---|---|---|---|
| Example 5 | Al 0.1% added | 82.15 | 1.21 | 0.29 | 0.16 | 0.01 | 2.53 | 13.65 |
| Example 6 | Al 0.3% added | 82.62 | 1.26 | 0.25 | 0.24 | 0.01 | 1.66 | 13.95 |
| Example 7 | Al 0.5% added | 82.38 | 1.26 | 0.19 | 0.29 | 0.01 | 1.35 | 14.50 |
| Example 8 | Al 1% added | 82.97 | 1.22 | 0.13 | 0.32 | 0.12 | 0.64 | 14.55 |
| Example 9 | Al 1% added anneal | 81.99 | 1.17 | 0.34 | 0.49 | 0.14 | 0.67 | 15.15 |

From Table 3, the content of Al in the Al- and O-containing silicon material is confirmed to increase in accordance with increase in the added amount of Al in step a). However, the increase rate of the content of Al in the Al- and O-containing silicon material is understood to be low relative to the increase rate of the added amount of Al in step a). From these results, a part of Al added in step a) is considered to have been dissolved and removed in the acid solution in step b).

The results of Example 8 and Example 9 reveal that the content of Al in the Al- and O-containing silicon material increases due to the addition of the annealing step in step a). That a relatively large amount of Al formed a substitutional solid solution composed of $CaSi_{2-x}Al_x$ as a result of substitution with Si of $CaSi_2$ in the annealing step and thus was prevented from being removed in the acid treatment in step b), is speculated.

Evaluation Example 7

For each of the lithium ion secondary batteries of Example 5 to Example 9, the first charging and discharging comprising: discharging down to 0.01 V with a current of 0.2 mA; and subsequent charging up to 1.0 V with a current of 0.2 mA, was performed.

Further, for each of the lithium ion secondary batteries of Example 5 to Example 9 after the first charging and discharging, a charging and discharging cycle of discharging down to 0.01 V with a current of 0.5 mA and then charging up to 1.0 V with a current of 0.5 mA was performed 50 times.

In addition, for each of the lithium ion secondary batteries of Example 5 to Example 9, the first charging and discharging comprising: discharging down to 0.01 V with a current of 0.2 mA; and subsequent charging up to 0.8 V with a current of 0.2 mA, was performed.

The initial efficiency and the capacity retention rate were calculated according to the formulae below.

Initial efficiency (%)=100×(first charge capacity)/(first discharge capacity)

Capacity retention rate (%)=100×(charge capacity at the 50th cycle)/(charge capacity at the first cycle)

Table 4 and Table 5 show the results of the first discharge capacity, the first charge capacity (1.0 V and 0.8 V), the initial efficiency (1.0 V and 0.8 V), and the capacity retention rate, together with the results of mass % of Al.

TABLE 4

|  | Al mass % | First discharge capacity (mAh/g) | First charge capacity (1.0 V) (mAh/g) | First charge capacity (0.8 V) (mAh/g) |
| --- | --- | --- | --- | --- |
| Example 5 | 0.16 | 2041 | 1740 | 1671 |
| Example 6 | 0.24 | 2081 | 1772 | 1704 |
| Example 7 | 0.29 | 2203 | 1890 | 1816 |
| Example 8 | 0.32 | 2167 | 1849 | 1776 |
| Example 9 | 0.49 | 2210 | 1888 | 1814 |

TABLE 5

|  | Al mass % | Initial efficiency (1.0 V) (%) | Initial efficiency (0.8 V) (%) | Capacity retention rate (%) |
| --- | --- | --- | --- | --- |
| Example 5 | 0.16 | 85.3 | 81.9 | 62 |
| Example 6 | 0.24 | 85.1 | 81.9 | 62 |
| Example 7 | 0.29 | 85.8 | 82.4 | 68 |
| Example 8 | 0.32 | 85.3 | 81.9 | 68 |
| Example 9 | 0.49 | 85.4 | 82.1 | 65 |

From Table 4, the lithium ion secondary batteries of Example 7 to Example 9, in particular, are considered to have exhibited excellent first charging and discharging capacities. From Table 5, the lithium ion secondary batteries of Example 5 to Example 9 are considered to have exhibited similar initial efficiencies and similar capacity retention rates. From the viewpoint of the capacity retention rate, the lithium ion secondary batteries of Example 7 to Example 9, in particular, are considered to be excellent.

From the results above, as for the mass % of Al ($W_{Al}$ %) in the Al- and O-containing silicon material of the present invention, not less than 0.25% is considered to be particularly suitable.

Example 10

Step a)

Ca, Al, and Si were weighed out in a carbon crucible. The element composition ratio between Ca and Si was 1:2, and the added amount of Al was set to be 1% of the total mass of Ca, Al, and Si. The carbon crucible was placed in a high-frequency induction heater and heated at around 1300° C. in an argon gas atmosphere, to produce a molten metal containing Ca, Al, and Si. The molten metal was poured into a predetermined mold, thereby being cooled to be a solid. The solid was ground into a powder form, and the resultant powder solid was subjected to step b).

Elemental analysis performed on the powder solid using an ICP-AES revealed that 40.58 mass % of Ca was contained, 58.41 mass % of Si was contained, 0.08 mass % of Fe was contained, and 0.91 mass % of Al was contained. The reason for the presence of a small amount of Fe is that Fe was contained as an impurity in a raw material metal.

Step b)

The powder solid obtained in step a) was added to 17 wt % hydrochloric acid at 0° C. in a nitrogen gas atmosphere, and the mixture was stirred. The reaction liquid was filtered, and the residue was washed with distilled water and methanol, and further, dried under a reduced pressure at room temperature, to obtain a precursor of an Al- and O-containing silicon material.

Step c)

The precursor of the Al- and O-containing silicon material was heated for 1 hour at 900° C. in a nitrogen gas atmosphere, to produce an Al- and O-containing silicon material.

Carbon Coating Step

The Al- and O-containing silicon material having been subjected to step c) was placed in a rotary kiln type reactor, and was subjected to thermal CVD under a flow of propane-argon mixed gas under conditions of 880° C. and a retention time of 60 minutes, to obtain a carbon-coated Al- and O-containing silicon material. The carbon-coated Al- and O-containing silicon material was used as an Al- and O-containing silicon material of Example 10.

Evaluation Example 8

An elemental analysis was performed on the Al- and O-containing silicon material of Example 10 using a similar method to that in Evaluation Example 3. Table 6 shows the result of the elemental analysis in terms of mass %.

TABLE 6

|  | Si | Ca | Fe | Al | Cl | C | O |
| --- | --- | --- | --- | --- | --- | --- | --- |
| Example 10 | 75.9 | 0.15 | 0.21 | 0.16 | 0.42 | 5.84 | 13.8 |

Evaluation Example 9

Figure 3:
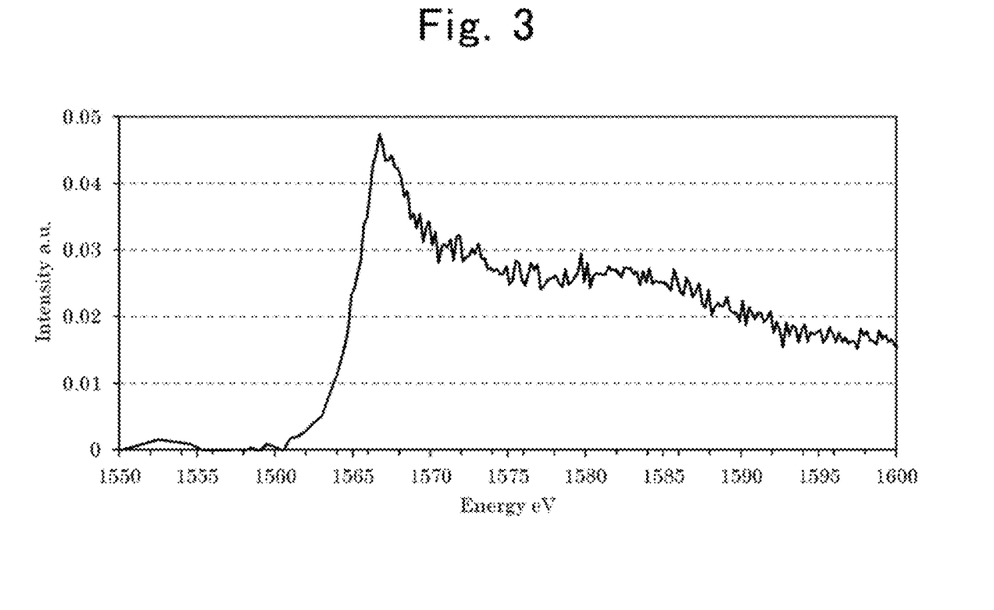
FIG. 3 is an XAFS spectrum of an Al- and O-containing silicon material of Example 10.

An analysis was performed for the K shell of Al in the Al- and O-containing silicon material of Example 10, using an X-ray absorption fine structure (hereinafter, abbreviated as XAFS) measurement device. FIG. 3 shows an obtained XAFS spectrum. From the XAFS spectrum in FIG. 3, a peak indicating Al—O bond was observed in a range of 1565 to 1570 eV, specifically, in a range of 1566 to 1568 eV.

At least a part of Al in the Al- and O-containing silicon material of the present invention was confirmed to be present in a state of being bound to oxygen.

The invention claimed is:

1. A negative electrode active material comprising
   an Al- and O-containing silicon material, the Al- and O-containing silicon material being configured such that
   a mass % of Al ($W_{Al}$ %) in the Al- and O-containing silicon material satisfies $0.25 \leq W_{Al} \leq 1$, and a peak indicating Al—O bond is observed in a range of 1565 to 1570 eV in an X-ray absorption fine structure measurement for a K shell of Al,
   a mass % of Fe ($W_{Fe}$ %) in the Al- and O-containing silicon material satisfies $0 \leq W_{Fe} \leq 0.3$,
   a mass % of Si ($W_{Si}$ %) in the Al- and O-containing silicon material satisfies $60 \leq W_{Si} \leq 90$,
   a mass % of O ($W_O$ %) in the Al- and O-containing silicon material satisfies $5 \leq W_O \leq 30$, and
   a relationship between the mass % of Al ($W_{Al}$%) and a mass % of Fe ($W_{Fe}$ %) satisfies $W_{Al} > W_{Fe}$.

2. The negative electrode active material according to claim 1, wherein
   the negative electrode active material has a structure made up of a plurality of plate shape silicon bodies laminated in a thickness direction.

3. The negative electrode active material according to claim 1, wherein
   the Al- and O-containing silicon material contains Fe, and the mass % of Fe ($W_{Fe}$ %) satisfies $0 < W_{Fe} < 0.1$.

4. The negative electrode active material according to claim 1, wherein
   the mass % of O ($W_O$ %) satisfies $5 \leq W_O \leq 21$.

5. The negative electrode active material according to claim 1, wherein
the Al- and O-containing silicon material contains Ca, and
a mass % of Ca ($W_{Ca}$%) in the Al- and O-containing silicon material satisfies $0 < W_{Ca} \leq 3$.

6. The negative electrode active material according to claim 1, wherein
the Al- and O-containing silicon material contains a halogen, and
a mass % of the halogen ($W_X$ %) in the Al- and O-containing silicon material satisfies $0 < W_X \leq 3$.

7. The negative electrode active material according to claim 1, wherein
the Al- and O-containing silicon material is coated with carbon, and
a mass % of carbon ($W_C$ %) in the Al- and O-containing silicon material satisfies $1 \leq W_C \leq 10$.

8. A negative electrode comprising the negative electrode active material according to claim 1.

9. A secondary battery comprising the negative electrode active material according to claim 1.

10. The negative electrode active material according to claim 1, wherein
the mass % of Al ($W_{Al}$ %) satisfies $0.25 < W_{Al} < 0.5$.

* * * * *